Nov. 12, 1963
D. GABOR
3,110,823
THERMIONIC ELECTRIC GENERATORS
Filed Nov. 9, 1960
2 Sheets-Sheet 1
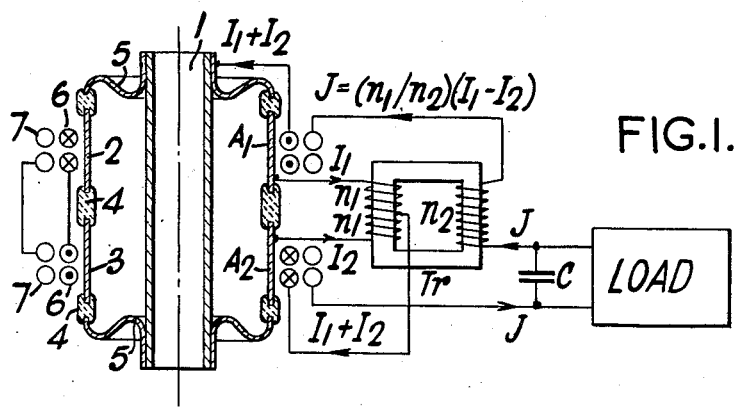
FIG.1.
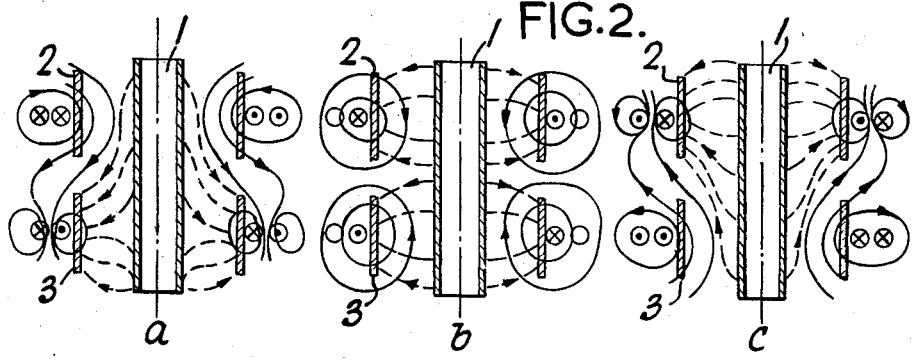
FIG.2.
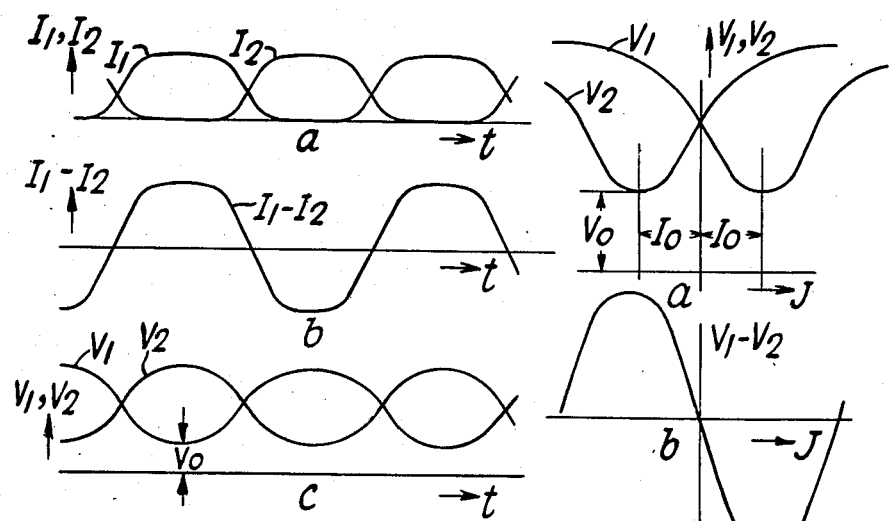
FIG.3.
FIG.4.
Inventor
DENNIS GABOR
By Cameron, Kerkam & Sutton
Attorneys Nov. 12, 1963  D. GABOR  3,110,823
THERMIONIC ELECTRIC GENERATORS
Filed Nov. 9, 1960  2 Sheets-Sheet 2
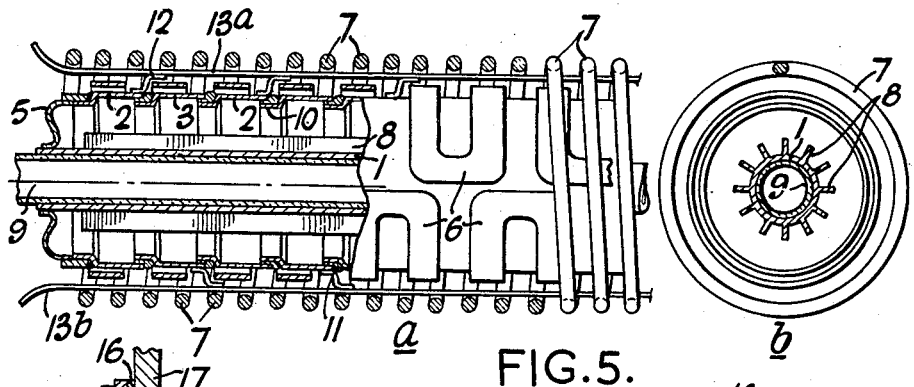
FIG.5.
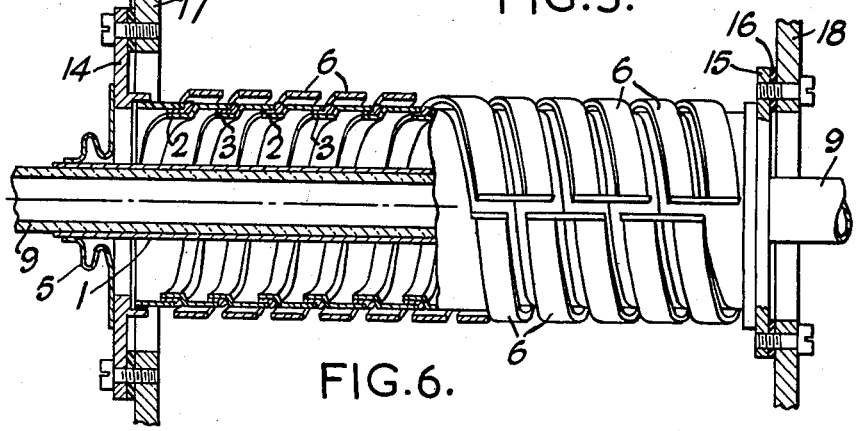
FIG.6.
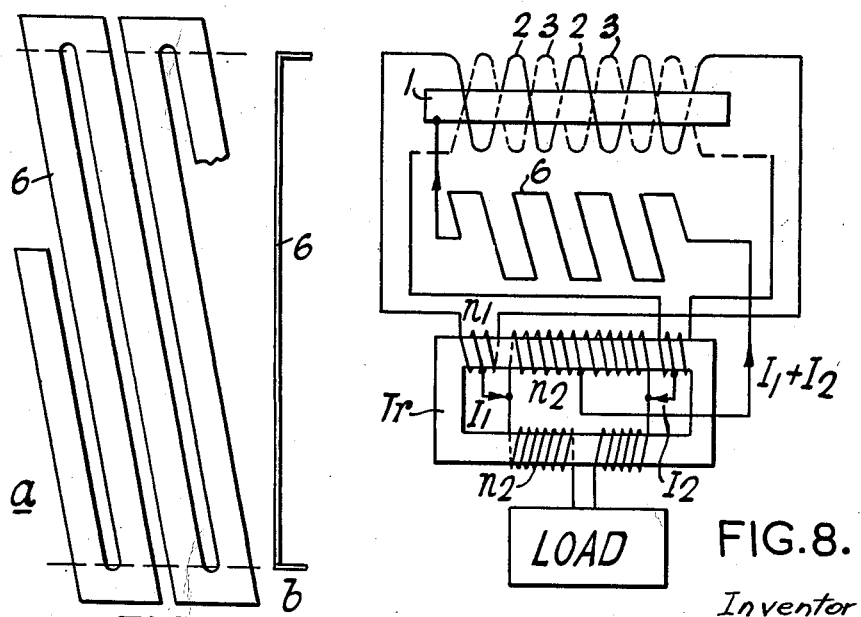
FIG.7.
FIG.8.
Inventor
DENNIS GABOR
By Cameron, Kerkam & Sutton
Attorneys United States Patent Office 3,110,823
Patented Nov. 12, 1963

3,110,823
THERMIONIC ELECTRIC GENERATORS
Dennis Gabor, London, England, assignor to National Research Development Corporation, London, England, a British corporation
Filed Nov. 9, 1960, Ser. No. 68,223
Claims priority, application Great Britain Nov. 10, 1959
12 Claims. (Cl. 310—4)

This invention relates to thermionic electric generators of the gas discharge or plasma type, and is particularly concerned with forms of such generators which convert thermal energy directly into alternating electric power.

Thermionic generators producing direct current by the passage of an arc in an alkali vapour such as caesium, from a hot cathode to a cold anode are well known. In a loaded condition the voltage available at the terminals of such a diode is of the order 1–2 volts only, while the currents are of the order of several hundred amperes in diode units of economical size. Though the voltage can be increased by series connection of diodes, the current remains inconveniently large for small generating units, such as may be used for example in motor cars. In the case of large generating units, such as may be used in power stations, the large direct current is not in itself objectionable, but a disadvantage arises from the fact that, except for very large distances and powers, the most economical method of distributing electrical energy is in the form of high voltage alternating current. As, however, the cost of large direct current motors is several times that of an alternator for the same power, and as the conversion itself entails losses, in this field D.C. thermoelectric generators start at a grave disadvantage. It is the purpose of the present invention to provide a thermoelectric generator which supplies alternating current so that the use of both D.C. motors and alternators is avoided.

According to this invention there is provided a thermionic electric generator comprising an electron emissive electrode and a plurality of collector electrodes facing said emissive electrode across a gap, a low pressure vapour filling in said gap, means for setting up a steady magnetic field in said gap, and means for setting up an alternating magnetic field in said gap, the means producing said steady and alternating magnetic fields being so arranged that said fields reinforce one another in the region between one of said collectors and said emissive electrode and neutralise one another in the region between an adjacent collector electrode and said emissive electrode in one half cycle of operation of said alternating magnetic field and vice versa in the reverse cycle of operation of said alternating magnetic field, whereby electron current flow from said emissive electrode is directed alternately towards one and the other of said collector electrodes.

In one form of the invention there is provided a thermionic electric generator comprising a tubular cathode, two collector electrodes each in the form of a helical winding with the convolutions of one helix intertwined with the convolutions of the other to form a two-start helix surrounding said cathode and a field-producing winding surrounding said collector electrode helix.

The low pressure filling may consist for example of caesium, rubidium, potassium or francium. The arrangements according to the invention have the effect of forcing the current from the cathode to go prevailingly to the collector which has instantaneously the lowest potential. This effect is achieved by the magnetic fields which completely surround the collector or collectors at higher potential, so that the electrons from the cathode cannot reach the said collector or collectors without crossing a magnetic field, while there is a path substantially free from magnetic fields from the cathode to the collector at the lowest potential. The magnetomotive force in the direct current magnetic field is made approximately equal to the peak value of the magnetomotive force in the field produced by the alternating current. Consequently at the instant when the magnetic field is doubled in the region of one collector, or system of collectors, it is very small or zero in the region of the other collector or system of collectors, and there is a path substantially free from magnetic fields from the common cathode to the last mentioned collector or collector-system.

It is known that arc discharges between a cathode and an anode in alkali vapours at low pressure can be maintained with a total arc drop considerably less than the ionization voltage of the said alkali atom. For instance, in a caesium arc currents of several amperes per cm.² can be maintained at only 1–1.5 volts total voltage drop, while the ionization potential of caesium is about 3.9 volts. It is also known that the cathode drop in alkali arcs is never less than the ionization potential, hence the observed low-voltage arcs exist only because there is an inverse field between the cathode sheath and the anode. Ions produced in the said sheath, which are required for space-charge neutralization in the whole volume of the discharge, will reach the anode region by being accelerated by the inverse field, while electrons have to diffuse, by virtue of their concentration gradient, against the said field. Consequently such low-voltage arcs can be maintained only so long as the electron diffusion is not impeded. If, however, a magnetic field is established, surrounding an anode, and approximately parallel to its surface, this, in conjunction with the electric field, which is substantially at right angles to the anode surface, will cause the electrons to drift at right angles to both, that is to say parallel to the anode surface, and thereby it will strongly reduce the speed of electron diffusion to the anode. If the magnetic field is sufficiently strong, the arc will be able to overcome this obstacle only by a gradient which assists the electrons on their way to the anode, instead of opposing it by an inverse field. This, however, means that the arc voltage must rise, all the more as now the ions are not assisted by the field, and there will be ion starvation near the anode. In the end an anode drop region will form before the anode, with a drop sufficient to produce ions, that is to say exceeding the ionization voltage. It is therefore possible, by the means above described, to make the electron current flow to the anode at the lowest potential, which it can reach by a path substantially free from magnetic fields, while there will be no current or only a very small current flowing to the anodes of higher potential, to which the way is barred by the magnetic field. Thus, while the total current from the cathode can remain substantially constant, the currents to the anodes will alternate, and as the current is largest where the potential is smallest and vice versa, the alternating current flows against the alternating voltage, and thereby conditions are created to make the device act as a generator of alternating current. In contrast to other A.C. generating gas discharge devices known as inverters, in the present invention it is not D.C. power which is converted into A.C., but thermal power, because it is the large temperature difference between the hot cathode and the cold anodes which is the source of the electron flow.

In order to operate efficiently, the device requires means for keeping the path from the cathode to the anode system which is at the lowest instantaneous potential substantially free from magnetic fields, that is to say means for making the magnetomotive forces of the A.C. and D.C. windings acting in conjunction with the said anode approximately equal and opposite. This may be achieved by coupling the two windings by means of a transformer, with the appropriate ratio of turns. It is known that in a transformer with low core reluctance the magnetomotive forces of the two windings annul one another. The ratio of turns is so determined, that if the magnetomotive forces in the transformer annul one another, they annul one another also in the region of one of the anode systems.

In the above explanatory passage reference has been made to the "anodes" of the device. In general, however, the term "collectors" is preferred since this is more expressive of the function of these electrodes as collectors of electrons and this term is therefore used elsewhere as an equivalent term.

The invention will be better understood with reference to the accompanying drawings:

FIG. 1 is a schematic cross section of a thermionic electric generator device according to the invention, together with its operating circuits.

FIG. 2 is an illustration of the magnetic fields in the device of FIG. 1, at three instants of the alternating cycle, $a$, $b$, and $c$.

FIG. 3, $a$, $b$, and $c$, are diagrams of the anode currents, their difference, and of the voltage as a function of time.

FIG. 4, $a$ and $b$, are diagrams of two collector voltages and of their difference as a function of the alternating current.

FIG. 5, $a$ and $b$, are a partial longitudinal section and a transverse section of an alternative form of device according to the invention.

FIG. 6 is a partial longitudinal section of another form of device according to the invention.

FIG. 7, $a$ and $b$, are a developed view and a section view of the D.C.-excited winding structure used in the device shown in the previous figure.

FIG. 8 is a schematic illustration of the operating circuit of the device as shown in FIG. 6.

In FIG. 1, which is a schematic longitudinal section of a thermoelectric generator, and its associated operating circuits, 1 is a tube the inner surface of which is exposed to the high temperature source, such as the products of a combustion process, while its other surface is capable of emitting electrons. 2, 3 are the electron collectors or anodes, of cylindrical shape, insulated from one another and from the cathode by annular insulators 4 of some suitable material, such as an alkali-resisting glass. The anodes and insulators form part of a vacuum envelope which is closed at both ends by metal members 5. The members 5 must be made thin and elastic, because they must take the deformation arising from the thermal expansion which takes place when the cathode 1 is heated to the temperature of the heating source, e.g. 1500° C., while the collectors are kept by a coolant at, say, 100–180° C. As the potential differences in devices of this type are of the order of a few volts only, water can be used as a coolant, without producing appreciable shunting. The envelope contains a small quantity of an alkali metal, such as caesium, at a pressure which in operation will be equal to the saturation pressure corresponding to the coolest point of the envelope, that is to say 100–180° C. For best operation the electron emitting material on the cathode 1 ought to have a work function such that at the operating temperature it can just supply a current density of a few amperes/cm.² At 1500° C. this work function is about 3 volts. The collectors on the other hand must have a surface with a work function as small as possible, for instance oxidized silver, which will take up a little caesium from the vapour. The work function can then be as low as 0.8 volt. Care must be taken that the collectors are not the coldest spot of the envelope, otherwise thick caesium layers, the work function of which is considerably higher, might condense on them. Thus, at 1500° C. cathode temperature the D.C. terminal potential of this device will be (3−0.8) volt minus the arc drop. In the absence of magnetic fields, and with a short path from the cathode to the collectors of rather large area, as shown in FIG. 1, the arc drop can be as low as 1.2 volts, hence about 1 volt D.C. may be available in the outer circuit.

Two systems of windings are arranged outside the collectors, in close proximity to them. One of these, 6, 6, is so arranged that the direct current flowing through them circles collector 2 in reverse sense to collector 3. The other, 7, 7, is energized by alternating current, which circulates throughout in the same sense.

FIG. 2 illustrates the magnetic field at three times, $a$, $b$ and $c$, of the current cycle. At $a$ the alternating current is at its peak value, which will be called positive. For simplicity the windings 6 and 7 are given equal numbers of turns, and it is assumed that the peak value of the alternating current through 7 is equal to the direct current through 6. Thus at the instant $a$ the magnetomotive force in the region of the upper collector 2, or $A_1$, is doubled, while in the region of the lower collector 3, or $A_2$, it is zero. The magnetic field lines are indicated in thin continuous lines. Thus for electrons liberated from the cathode 1 the way to $A_1$ is barred at this instant, while the path from the cathode to $A_2$ is substantially free from magnetic field and the electron current from the whole cathode area can flow to this collector. The electron current flow is indicated in dotted lines.

At time $b$, a quarter-cycle later, the alternating current is zero, and the current is divided equally between the two collectors. If a choke is used in the D.C. circuit, the cathode current will remain substantially constant during the whole cycle, only its distribution will change. At time $c$, another quarter-cycle later, the alternating current has its negative maximum, and the whole current now flows to the top anode $A_1$.

Returning to FIG. 1, this figure illustrates also a circuit for the operation of the device. Counting, as usual, electron currents as positive, $I_1$, $I_2$ are the currents from collectors $A_1$ and $A_2$. These are led into the primary winding of a transformer $Tr$, having $2n_1$ primary turns and a centre tap. This collects the sum $I_1+I_2$ of the two currents, which is substantially a direct current, and this is fed back, through the windings 6, 6 to the cathode 1. It is understood that it is advantageous to feed back the current through both ends of the cathode, in order to minimize the magnetic field excited by the axial current.

The secondary winding of the transformer $Tr$, having $n_2$ turns, carries an alternating current J. This is excited by the alternating flux produced by the alternation of the currents $I_1$ and $I_2$, and if the reluctance of the transformer core is small, its value required for compensating the magnetic pressure in the transformer is approximately $J=(n_1/n_2)(I_1-I_2)$, with a maximum value equal to $(n_1/n_2)$ times the maximum of either of the collector currents. If, as shown in the example, in FIGS. 1 and 2, the number of turns of the windings 6 and 7 is equal, one must therefore make $n_1=n_2$, otherwise one must adjust the ratio appropriately so as to obtain minimum arc drop in the path leading to the collector of lower potential. Once this condition is found, the optimum will be automatically maintained at any load, because the D.C. and A.C. currents in the coils 6, 7 will remain in constant proportion. The load is in series with the secondary winding.

In order to make the device oscillate at a desired frequency, a condenser C must be introduced in the A.C. circuit, in parallel or in series with the load.

FIG. 3$a$, $b$, $c$, illustrate the operation, and explain in a qualitative way the tendency of the system to self-oscillation. It is seen that while $I_1+I_2$ maintains practically constant $I_1-I_2$ is an alternating current and that e.g. $I_1$ is largest at the instant when the voltage $V_1$ of its collector is smallest.

FIG. 4 explains the conditions for self-oscillation in a more quantitative way. In FIG. 4, a, the collector voltages $V_1$, $V_2$ are plotted against the instantaneous value of the current J in the coil 7. The D.C. premagnetizing or bias currents for the two collectors are $\pm I_0$. The minimum voltage drop occurs at the two collectors when J compensates the bias current $I_0$. For currents J on either side of these optima the arc drop first increases parabolically, and then flattens out.

FIG. 4, b, illustrates the resulting characteristic, as seen from the A.C. circuit. The electromotive force in this circuit is proportional to the difference $V_1-V_2$ of the collector voltages, and this, plotted against the current J in this circuit has a falling part, representing a negative resistance. This can be used, as is well known in the art for the generation of continuous oscillation in an L, C circuit. L is the sum of the inductance of the coil 7, of the leakage inductance of the transformer, and of the inductance of the load. L and C together determine, apart from a correction due to the load and to the non-linearity of the characteristic, the frequency at which the device will oscillate.

Instead of making the device self-oscillating, it may also be controlled by an external A.C. source. This is a preferable mode of operation if many units are working in parallel or in series on the same load. If power is being delivered into a grid, a small fraction may be taken out of the grid for pulling the thermoelectric generators into synchronism and phase with the other generators supplying the grid.

FIG. 5 illustrates one form of discharge device according to the invention, which, unlike the one shown in FIG. 1, contains a great number of collectors 2, 3 in association with one cathode 1. It is advantageous not to make the collectors very long, but instead to use a greater number, so that the discharge can find a short path, free from magnetic field from any point of the long cathode to the nearest collector at low instantaneous potential. A certain difficulty arising from long cathodes is the circulating magnetic field, caused by the axial cathode current flow. As previously mentioned, this effect is minimized if the cathode is fed from both ends. A further method of reducing its effect is shown in FIG. 5. The cathode tube 1 is fitted with radial vanes 8, in good heat contact with 1, and coated with emissive material. Electrons will leave these in azimuthal direction, i.e. in the direction of the magnetic field, and proceed in this direction through the thin catholic sheath. This greatly reduces the effect of the magnetic field on the emission, because it is at this point that the electrons are slowest and therefore most easily turned back by the magnetic field. A tube 9 of ceramic or like refractory material is shown in this construction to protect the metal tube 1 from the corrosive action of the flame gases used as the source of heat for the generator.

The collectors 2, 3 are of annular shape, with rebated edges 10, at least at one end, so that the collectors can be stacked in a column, and joined solidly together by means of a small quantity of a suitable insulating cement, such as alkali-resistant glass solder 11.

The D.C.-carrying winding 6 is formed out of a single sheet of metal, cut into a meander pattern. Soldering tabs 12 project through the slits between the meanders and are connected to two metal strips 13a, 13b, which carry the total current of the collector systems 2 and 3 respectively. The A.C. winding 7 is in the form of a continuous coil outside these strips.

FIG. 6 shows a further form of the invention, in which the collectors are not annular, but helical, so that the anodes 2 and 3 form the two branches of a two-start helix. Two metal strips profiled as shown, are wound on a mandrel into a two-start helix, and assembled by means of glass solder or the like into a solid tube. It is a particular advantage of this design, that the helical anode strips themselves can be used to provide the function of the A.C. coil 7. This has the advantage that, as the A.C. coil is inside in this design, it is not partially screened off by the annular collectors as in the previously described models, and therefore this model can be used for generating much higher frequencies. The winding 6 which carries the D.C. bias currents is again formed out of a single sheet of material, having slits cut from alternate edges to form a meander as shown separately in FIG. 7. FIG. 7, a, shows a fragment of the sheet in the flat, the dotted lines showing where the edges have to be turned up. FIG. 7, b, is a side view, with the edges turned up, and before it is rolled to a cylinder. A gap is left between 6 and the collector body, to allow circulation of the coolant.

FIG. 6 illustrates also the fixing of a generator unit in a chamber containing the coolant. After winding the double helix and enamel-soldering the collector-body into one solid tube the ends are turned plane, and are cemented, again using a suitable insulator such as alkali-resistant enamel glass, into metal flanges 14, 15. The thin, flexible end members 5, preferably of a metal of small heat conductivity such as stainless steel are brazed or welded to these flanges. The unit is then inserted into the coolant chamber and screwed, with elastic gaskets 16 inserted, to its walls 17, 18. The coolant chamber can contain any number of such units. As in the previous model, FIG. 5, the cathode tubes are protected by tubes of refractory ceramic or the like from the corrosive action of the heating medium, such as flame gases, and serve also for guiding the said gases into a recuperator.

FIG. 8 shows the operating circuits for the device as described in conection with FIG. 6. The collectors 2, 3 are shown schematically as helical lines, one of them being dotted for clarity. The circuit is similar to that shown in FIG. 1, but with the difference that, as the coil 7 now consists of the two helical collectors 2, 3, through which the alternating current flows in parallel, but which have different potentials, two windings must be provided on the transformer Tr, each having $n_1$ turns. Both are centre-tapped, and the anode current $I_1$ and $I_2$ are taken off at these points. These now divide over two windings of the transformer, one centre-tapped for the return of the D.C. curent, $I_1+I_2$, the other in series with the load. Both, however, have the same number of turns $n_2$, and are wound in such a sense that whatever the load, that is to say in whatever way the currents $I_1$ and $I_2$ divide themselves between the two windings of the transformer, their total magnetomotive force will always be proportional to $I_1-I_2$, so that the currents in the selical collectors 2, 3 always keep the correct proportion to the current $I_1+I_2$ in the winding 6.

Various alternatives and modifications of the invention will be obvious to those skilled in the art. For example the arrangement of the cathode and of the collectors can be reversed, so that the heat source is outside and the coolant inside. If the load is constant the D.C. biasing winding 6 can be replaced by a system of permanent magnets. Moreover, instead of arranging for the D.C. magnetic field to be reversed in sense as between one cathode/collector gap and the next and the A.C. field to be uniform, the reverse arrangement could be used i.e. a uniform D.C. magnetic field could be used and the A.C. windings connected in anti-phase as between one cathode/collector gap and the next. Various known circuits, in the technique of inverters and of rectifiers can be used to replace the examples described herein.

I claim:

1. Thermionic electric generator comprising an electron emissive electrode and a plurality of collector electrodes facing said emissive electrode across a gap, a low pressure vapour filling in said gap, means for setting up a steady magnetic field in said gap, and means for setting up an alternating magnetic field in said gap, the means producing said steady and alternating magnetic fields being so arranged that said fields reinforce one another in the region between one of said collectors and said emissive electrode and neutralise one another in the region between an adjacent collector electrode and said emissive electrode in one half cycle of operation of said alternating magnetic field, and that said fields neutralise one another in the region between said one collector electrode and said emissive electrode and reinforce one another in the region between said adjacent collector electrode and said emissive electrode in the reverse cycle of operation of said alternating magnetic field, whereby electron current flow from said emissive electrode is directed alternately towards one and the other of said collector electrodes.

2. Thermionic electric generator comprising an electron emissive electrode, two sets of collector electrodes facing said emissive electrode across a gap, a low pressure vapour filling in said gap, and means for producing magnetic fields in said gap, said fields consisting of a steady field and an alternating field with the two fields in like sense in those regions of said gap associated with the collector electrodes of one of said sets of collector electrodes and reverse sense in those regions of said gap associated with the collector electrodes of the other of said sets of collector electrodes during one half-cycle of said alternating field, and with the two fields in reverse sense in those regions of said gap associated with the collector electrodes of said one set and like sense in those regions of said gap associated with the collector electrodes of said other set during the other half-cycle of said alternating field, whereby electron current from said emissive electrode is directed alternately towards the collector electrodes of each of said two sets.

3. Thermionic electric generator comprising an electron emissive electrode, a plurality of sets of collector electrodes facing said emissive electrode across a gap, a low pressure vapour filling in said gap and means for producing magnetic fields in said gap, said fields consisting of a steady field and an alternating field, the steady field being in one sense in those regions of said gap lying between said emissive electrode and the collector electrodes of one of said sets and in reverse sense in those regions of said gap lying between said emissive electrode and the collector electrodes of another of said sets, the alternating field being in like sense at all regions of said gaps whereby the steady field will be augmented by said alternating field in some of said regions and diminished by said alternating field in the others of said regions in one half-cycle of said alternating field, and will be diminished by said alternating field in said some regions and augmented by said alternating field in said other regions in the other half-cycle of said alternating field.

4. Thermionic electric generator as claimed in claim 3 comprising two sets of collector electrodes, the electrodes of one set alternating with the electrodes of the other set, a field-producing winding surrounding each collector with each successive winding connected in reverse sense to the preceding one, and a further field-producing winding surrounding all the said collector electrodes.

5. Thermionic electric generator as claimed in claim 3 wherein the collector electrodes surround the emissive electrode and constitute at least part of an envelope enclosing said low pressure vapour filling.

6. Thermionic electric generator as claimed in claim 1 comprising two sets of annular collector electrodes surrounding said emissive electrode with the electrodes of one set alternating between the electrodes of the other set, a direct current field producing winding surrounding said collector electrodes, and an alternating current field winding surrounding said direct current field winding.

7. Thermionic electric generator as claimed in claim 6, wherein said direct current field winding is in the form of a continuous metallic strip encircling each successive collector electrode in turn in alternate directions.

8. Thermionic electric generator as claimed in claim 6 wherein said emissive electrode is provided with vanes extending radially from its surface and coated with electron emissive material.

9. Thermionic electric generator as claimed in claim 8 wherein said emissive electrode is lined with refractory material.

10. Thermionic electric generator comprising a tubular cathode, two collector electrodes each in the form of a helical winding with the convolutions of one helix intertwined with the convolutions of the other to form a two-start helix surrounding said cathode, and a field-producing winding surrounding said collector electrode helices.

11. Thermionic electric generator as claimed in claim 10 wherein said field producing winding is in the form of a meander successive legs of which surround convolutions of each of said collector electrode helices in turn so as to provide a current-carrying path surrounding each successive convolution in alternate directions.

12. Thermionic electric generator as claimed in claim 11 wherein the convolutions of said helical collector electrodes are joined each to each by insulating means so as to constitute a gas-tight structure, and which includes means closing the ends of the tubular space between said cathode and said collector electrode structure, said tubular space being filled with a low pressure vapour filling.

References Cited in the file of this patent
UNITED STATES PATENTS

| | | |
|---|---|---|
| 2,455,171 | Haantjes | Nov. 30, 1948 |
| 2,806,162 | McQuillen et al. | Sept. 10, 1957 |